United States Patent Office

2,892,969
Patented June 30, 1959

2,892,969

THYRATRON REGULATOR

Henry F. McKenney, Greenwich, Conn., and Rodney W. Unold, Fort Lee, N.J., assignors to The Sperry Rand Corporation, Ford Instrument Company Division, Long Island City, N.Y., a corporation of Delaware Application July 18, 1956, Serial No. 598,609

3 Claims. (Cl. 315—198)

This invention relates to a thyratron regulator which operates in conjunction with thyratron rectifiers so as to maintain their D.C. output voltage constant against changes in D.C. load current and changes in A.C. input voltages to the thyratron rectifiers.

In general, the regulator serves to control the output of a group of thyratrons by comparing the thyratron output voltage with the output voltages of some gas tubes whose voltage is constant over a given current range. If the output of the thyratrons is not the required value an error signal is developed at the regulator input. The output of the regulator is employed to control electronic bleeders for the thyratron output which are also coupled to the grids of the thyratrons whose voltage output is thereby regulated to 1% or less.

One object of the invention is to provide means for regulating the output voltage of a thyratron rectifier.

Another object of the invention is to provide means which tend to maintain the thyratron voltage constant although the current output is varied according to the load.

Figure 1:
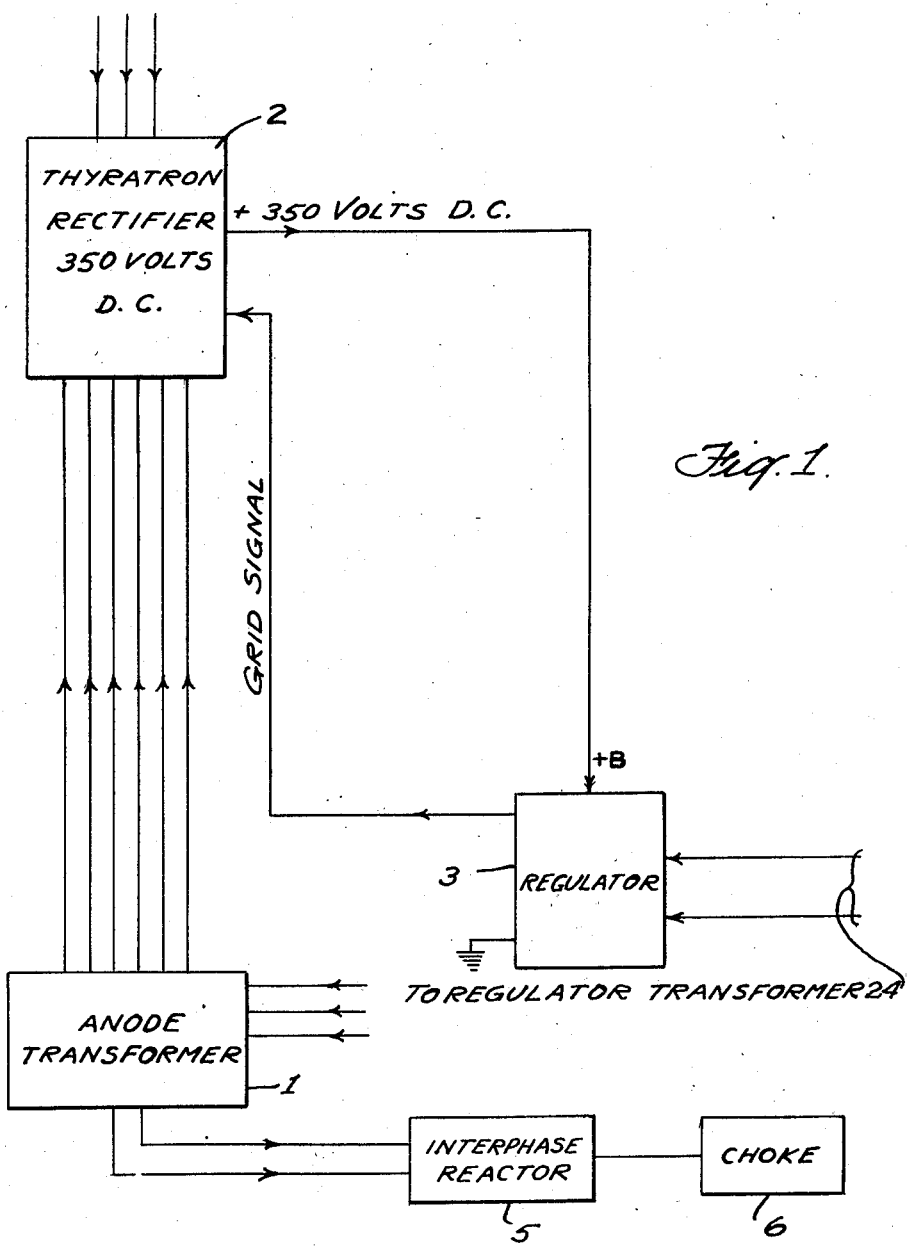
Figure 2:
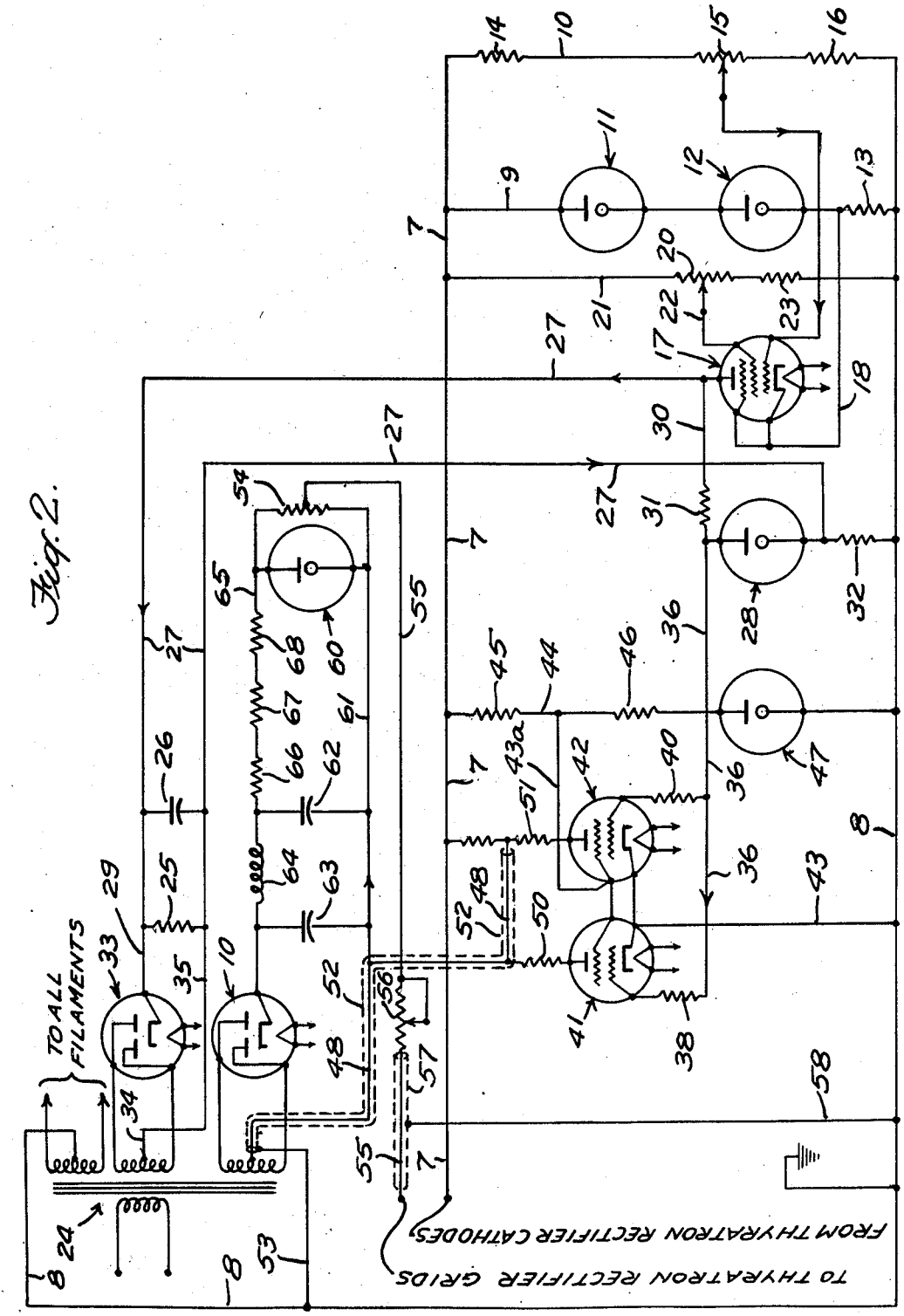

Other objects and advantages of the invention may be appreciated on reading the detailed description of the regulator which is illustrated in the accompanying drawings as follows:

Fig. 1 is a diagram showing the regulator in the circuit of the thyratron rectifiers; and Fig. 2 is a schematic showing the arrangement of the units which constitute the preferred embodiment of the invention.

As shown in Fig. 1 anode transformer 1 is connected to thyratron rectifier 2 which includes a group of six thyratrons. The transformer 1 provides a double three phase bank output to the anodes of the thyratron rectifiers and has a three lead input connected to its primary. The output of the thyratron rectifier 2 is connected to regulator 3 whose output provides the grid control for the thyratron rectifiers. The anode transformer has Y connected coils and an interphase or balancing reactor 5 receives the output on its center tapped transformer which is connected between the two neutrals of the anode transformer 1. The interphase reactor 5 serves to average the current from the double three phase banks of the thyratron rectifier 2 and provides a large A.C. inductance which is required to prevent a six phase mode of rectifier operation. A choke 6 is connected to the interphase reactor 5 being adjusted in the circuit for maximum A.C. impedance over the D.C. operating range.

The regulator 3 is schematically shown in Fig. 2. The D.C. output of the thyratron rectifiers is placed on lead 7. Between the lead 7 and grounded return lead 8, which is connected to the center tap of a secondary transformer 24 employed to supply power to the filament of the regulator tubes, there is provided a nonlinear bridge network comprising a branch lead 9 and a voltage dividing branch lead 10. A pair of constant voltage gas tubes 11 and 12 and a resistor 13 are inserted in the branch lead 9 and a resistor 14, potentiometer 15 and resistor 16 are series connected in the branch lead 10.

The resistor 13 provides biasing potential for the cathode and a grid of input pentode 17 by virtue of lead 18 which connects the resistor 13 to the elements of the pentode 17. A potentiometer 20 is provided in a third branch lead 21 and has a variable tap connection 22 coupled to a grid of pentode 17. A resistor 23 is provided in the branch lead 21 in series with the potentiometer 20. The control grid of the pentode 17 is connected to the potentiometer 15 of the signal generating bridge network.

An RC network comprising resistor 25 and capacitor 26 is connected across lead 27 which connects the plate of pentode 17 to gas tube 28. A lead 30 having a bias resistor 31 connects the plate of pentode 17 to the anode of the gas tube 28. Bias resistor 32 connects the cathode of tube 28 to the lead 8. A double diode 33 is cathode connected to one side of the RC network by lead 29. The plates of the double triode 33 are connected across a second secondary of the transformer 24 which has a center tap 34 connected to the other side of the RC network by means of line 35.

Lead 36 connects the anode of the gas tube 28 to grid resistors 38 and 40 for shunt regulator tubes 41 and 42, respectively. The cathodes of the shunt regulator tubes are connected together and to lead 8 by means of lead 43. Secondary grids of the shunt regulator tubes are also connected together and to branch lead 44 by means of lead 43ᵃ and is connected in parallel with the branch leads 9 and 10. Grid resistors 45 and 46 are connected in series with gas tube 47 in the branch lead 44 whereby a regulated bias may be established on the secondary grids of the shunt regulator tubes 41 and 42. The plates of the shunt regulator tubes 41 and 42 are biased by means of a lead 48 one end of which is connected to the center tap of a third secondary of the transformer 24, the other end being connected to plate resistors 50 and 51 for the shunt regulator tubes 41 and 42, respectively. The plate resistors 50 and 51 are also connected to the input lead 7 whereby the regulator tubes under the control of the bridge network serves as a current bleeder for the input lead and hence a voltage load regulator for the thyratrons. A shield 52 guards the lead 48 from fluctuations due to stray electromagnetic fields and is connected to the grounded lead 8 by means of lead 53.

The lead 48 is connected to one side of the potentiometer 54 the center tap of which is connected to the thyratron rectifier grids by means of regulator output lead 55. A potentiometer 56 in the output lead 55 serves to regulate the signal produced by the regulator. The lead 55 is protected by shield 57 disposed between the potentiometer 56 and the connection point on the regulator for the thyratron rectifier grids. The shield 57 is grounded by lead 58 which is connected to the lead 8.

The signal which is amplified by the shunt regulator tubes is applied to coupling gas tube 60 by means of lead 61 in which there is connected the potentiometer 54. The coupling tube 60 is placed across the potentiometer 54 and the sum of the voltages developed therein constitutes the output voltage of the regulator on the lead 55 which is connected to the grids of thyratron rectifiers. The coupling tube 60 is also placed across capacitors 62 and 63 which have corresponding plates separately connected to each side of choke coil 64, respectively, in coupling tube anode lead 65. Resistors 66, 67 and 68 are series connected in the lead 65 between the choke coil 64 and the anode of coupling tube 60. The anode lead 65 serves to bias the cathode element of double diode 70 the plate elements of which are connected across the third secondary of the transformer 24.

The regulator operates as follows: A sample of the D.C. voltage to be controlled is compared to the output voltages of the gas tubes 11 and 12 whose voltage is constant over a given current range. If the voltage is not the required value then an error signal exists in the bride circuit comprising gas tubes 11 and 12, and resistor 13 in branch lead 9 and resistor 14, potentiometer 15 and resistor 16. The error signal developed is applied to pentode tube 17 and is amplified and coupled through gas tube 28 and resistor 32 to the grids of the shunt tube regulator tubes 41 and 42.

The shunt tube regulator tubes operate in a dual capacity. First they act as amplifiers to produce an amplified output signal in response to input signal mentioned above. This amplified signal is applied to the coupling tube 60 and the sum of the developed voltages comprises the output voltage of the regulator which is coupled to the thyratrons as mentioned previously. The second function of the shunt regulator tubes is the capacity to operate as an electronically controlled variable load resistor by virtue of the current that the tubes draw in response to the grid signal. When the load is small the shunt regulator tubes tend to draw a larger plate current thus tending to maintain the thyratron load constant. Conversely when the load is high the plate current in the shunt tubes is a minimum again tending to maintain the thyratron constant. The thyratron regulator is a direct coupled circuit which operates in conjunction with the thyratron rectifiers so as to maintain their D.C. output voltage constant in spite of load changes of 2.0 amperes to 20 amperes or a load range of 10 to 1 and also maintains the system ripple voltage at 1% or less throughout the operating range of the system, i.e., ±10 variation in A.C. input voltage and 2–20 amperes D.C. output current at 350 v. regulated to 1% or less.

It should be understood that the described embodiment of the invention is preferred for optimum circuit performance, but that the principle and scope of the invention is to be construed solely in accordance with the following claims.

What is claimed is:

1. A thyratron regulator comprising a thyratron rectifier, a regulator input lead connected to receive the output of said thyratron rectifier, a return lead, a bridge network connected across said regulator and return leads for comparing the output of said thyratron rectifier with a voltage generated in said bridge network, said bridge network having two branch leads with a constant voltage generator in one lead and voltage dividing resistors in the other lead, a regulator output circuit connected to said thyratron rectifier and a shunt regulator tube unit also connected across said regulator input and return leads being thereby constituted as a bleeding connection for said input lead, said shunt regulator tube unit being controlled by the output of said bridge network and having a thyratron voltage controlling connection with said regulator output circuit whereby said shunt regulator tube unit is adapted to regulate the voltage supplied to said thyratron rectifier by said regulator output circuit by virtue of its bridge shunting connection to said regulator input circuit as well as by virtue of its voltage regulator connection to the output of said bridge network.

2. A thryatron regulator as claimed in claim 1 wherein there is provided a grid tube between the output of said bridge network and said shunt regulator tube unit, said bridge network being in grid biasing and grid signal controlling connection with said grid tube and the output of said grid tube being in voltage regulating control of said shunt regulator tube unit.

3. A thyratron regulator as claimed in claim 1 wherein means are provided for combining the output of said shunt tube unit and a phase shifted, alternating current voltage in said regulator output circuit, the combined voltage therein being placed on the grid of the regulated thyratron.

References Cited in the file of this patent
UNITED STATES PATENTS

| | | |
|---|---|---|
| 1,995,404 | Stoller | Mar. 26, 1935 |
| 2,005,893 | Gulliksen | June 25, 1935 |
| 2,020,961 | Quarles | Nov. 12, 1935 |
| 2,568,701 | Arnold | Sept. 25, 1951 |
| 2,590,180 | Juhola | Mar. 25, 1952 |